(12) United States Patent
Hooli et al.

(10) Patent No.: US 8,825,040 B2
(45) Date of Patent: Sep. 2, 2014

(54) SELECTION OF CONNECTION TYPE IN CELLULAR SYSTEM

(75) Inventors: Kari Juhani Hooli, Oulu (FI); Kari Veikko Horneman, Oulu (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/054,507

(22) PCT Filed: Jul. 17, 2008

(86) PCT No.: PCT/EP2008/059348
§ 371 (c)(1),
(2), (4) Date: Jan. 25, 2011

(87) PCT Pub. No.: WO2010/006650
PCT Pub. Date: Jan. 21, 2010

(65) Prior Publication Data
US 2011/0117907 A1     May 19, 2011

(51) Int. Cl.
*H04W 4/00*    (2009.01)
(52) U.S. Cl.
USPC .................. 455/422.1; 455/425; 455/435.2; 455/452.2; 455/41.2; 455/513; 455/11.1; 455/515; 455/67.11; 455/553.1

(58) Field of Classification Search
None
See application file for complete search history.

(56) References Cited

U.S. PATENT DOCUMENTS

| 5,802,467 | A * | 9/1998 | Salazar et al. ............... 455/420 |
| 6,223,029 | B1 * | 4/2001 | Stenman et al. ............. 455/420 |
| 7,239,891 | B2 * | 7/2007 | Hollstrom et al. ......... 455/556.1 |
| 7,376,122 | B2 * | 5/2008 | Draves et al. ................. 370/351 |
| 7,385,960 | B2 * | 6/2008 | Bansal et al. ................. 370/338 |
| 2005/0096024 | A1 | 5/2005 | Bicker et al. ................. 455/417 |
| 2006/0205408 | A1 * | 9/2006 | Nakagawa et al. .......... 455/445 |
| 2007/0041351 | A1 * | 2/2007 | Hazra et al. ................... 370/338 |

FOREIGN PATENT DOCUMENTS

WO   WO 98/39936   9/1998

OTHER PUBLICATIONS

Agrawal D et al: "Issues in integrating cellular networks, wlans, and manets: a futuristic heterogeneous wireless network", IEEE Communications Society, US, vol. 12, No. 3, Jun. 1, 2005 , pp. 30-41, XP011134873 ISSN: 1070-9916, (pp. 30-41).

George Neonakis Aggélou et al: "On the Relaying Capability of Next-Generation GSM Cellular Networks" IEEE Personal Communications, IEEE Communications Society, US, vol. 8, No. 1, Feb. 1, 2001, pp. 40-47, XP011092417 ISSN: 1070-9916 (pp. 40-47).

(Continued)

*Primary Examiner* — Willie J Daniel, Jr.
(74) *Attorney, Agent, or Firm* — Harrington & Smith

(57) ABSTRACT

The present invention presents a method and a controller for selecting the type of connection used to connect a terminal device to a serving base station. The connection type is selected on the basis of monitored communication-environmental parameters of the terminal device. The selection is made between a direct cellular radio connection and a relayed cellular radio connection. The relayed connection is established through another terminal device acting as a relay terminal for the connection being relayed. A direct device-to-device link between the two terminal devices is established as a cognitive radio connection, and a radio access technology and communication parameters of the device-to-device link may be negotiated between the terminal devices. The relay terminal then links the device-to-device link to a direct cellular radio connection between the relay terminal and the serving base station.

30 Claims, 4 Drawing Sheets

(56) References Cited

OTHER PUBLICATIONS

Gan C-H et al: "Modeling Opportunity Driven Multiple Access in UMTS" IEEE Transactions on Wireless Communications, IEEE Service Center, Piscataway, NJ, US, vol. 3, No. 5, Sep. 1, 2004, pp. 1669-1677, XP011120206, ISSN: 1536-1276 (pp. 1669-1677).

IEEE Std 802.11™-2007 (Revision of IEEE Std 802.11-1999) IEEE Standard for Information technology—Telecommunications and information exchange between systems—Local and metropolitan area networks—Specific requirements Part 11: Wireless LAN Medium Access Control (MAC) and Physical Layer (PHY) Specifications Jun. 12, 2007, (1232 pages).

* cited by examiner

SELECTION OF CONNECTION TYPE IN CELLULAR SYSTEM

FIELD

The invention relates to the field of cellular radio telecommunications and, particularly, to utilization of direct device-to-device connections in a cellular communication system.

BACKGROUND

Modern cellular telecommunication systems and terminals of such systems are capable of supporting device-to-device communication capabilities for efficient and cost-effective content delivery, network operation and performance. Accordingly, two terminals located relatively close to each other in the same cell may be configured by the network to communicate over a direct connection instead of routing the data through a cellular network. It is even known that an ad hoc network among multiple terminal devices may be formed based on the IEEE 802.11 standard, for example, and connections with the cellular network may utilize this ad hoc network to improve the overall coverage and performance of the cellular system. However, more efficient utilization of such ad hoc networks would be advantageous from the viewpoint of the cellular telecommunication system.

BRIEF DESCRIPTION

According to an aspect of the present invention there is provided a method comprising monitoring, while in an idle state by a terminal device of a cellular telecommunication system, communication-environmental parameters of the cellular telecommunication system, wherein the terminal device supports cellular radio connections established directly between the terminal device and a base station of the cellular telecommunication system and device-to-device connections established directly between two or more terminal devices according to one or more radio access technologies selected from a plurality of radio access technologies supported by the two or more terminal devices; selecting, by the terminal device in the idle state prior to establishing a communications connection, either a direct cellular radio connection or a relayed cellular radio connection to connect the terminal device to the cellular telecommunication system, wherein the relayed cellular radio connection refers to a connection established between the base station and the terminal device through a relay terminal device configured to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters.

According to another aspect of the present invention, there is provided an apparatus comprising: a controller; and a memory including computer program code, the memory and the computer program code configured, with the controller, to cause the apparatus to perform at least the following: monitoring, while in an idle state by a terminal device of a cellular telecommunication system communication-environmental parameters of the cellular telecommunication system, wherein the terminal device supports direct cellular radio connections established directly between the terminal device and a base station of the cellular telecommunication system and device-to-device connections established directly between two or more terminal devices according to one or more radio access technologies selected from a plurality of radio access technologies supported by the two or more terminal devices, and selecting, by the terminal device in the idle state, prior to establishing a communications connection either a direct cellular radio connection or a relayed cellular radio connection as the communications connection to connect the terminal device to the cellular telecommunication system, wherein the relayed cellular radio connection refers to a connection configured by the base station by selecting one or more radio access technologies for communication by the terminal device through a relay terminal device configured to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters.

According to another aspect of the present invention, there is provided a method for managing connections in a terminal device of a cellular telecommunication system, the method comprising: monitoring, while in an idle state by a terminal device of a cellular telecommunication system, communication-environmental parameters of the cellular telecommunication system, wherein the terminal device supports cellular radio connections established directly between the terminal device and a base station of the cellular telecommunication system and device-to-device connections established directly between two or more terminal devices according to one or more radio access technologies selected from a plurality of radio access technologies supported by the two or more terminal devices; selecting, by the terminal device in the idle state prior to establishing a communications connection, either a direct cellular radio connection or a relayed cellular radio connection to connect the terminal device to the cellular telecommunication system on the basis of the monitored communication-environmental parameters, wherein the relayed cellular radio connection refers to a connection established between the base station and the terminal device through a relay terminal device configured by the base station by selecting the one or more radio access technologies to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters; and receiving from the base station the configuration of the one or more radio access technologies to be used in the device-to-device connection for the relayed cellular radio connection and utilizing said received configuration in the device-to-device connection of the relayed cellular connection.

According to another aspect of the invention, there is provided a method comprising A method, comprising: receiving a connection request at a terminal device, monitoring, while in an idle state by the terminal device of a cellular telecommunication system, one or more communication-environmental parameters of the cellular telecommunication system prior to establishing a communications connection with the cellular telecommunication system, wherein the terminal device is capable of establishing the communications connection with the cellular telecommunication system via a cellular radio connection directly with a base station of the cellular telecommunication system, and where the terminal device is capable of establishing the communications connection with the cellular telecommunication system via a relayed communication connection directly with another terminal device and indirectly with the base station via the relayed communication connection; and establishing the communications connection with the cellular telecommunication system using either a direct connection between the terminal device and the base station or using the relayed communication connection between the terminal device and said another terminal device depending on the monitored communication-environmental parameters, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters, and wherein the relayed communication connection is configured by the base station by selecting one or more radio access technologies selected from a plurality of radio access technologies supported by the terminal device and said another terminal device, and wherein the communications connection is determined by the terminal device depending on the monitored communication-environmental parameters prior to establishing the communications connection.

LIST OF DRAWINGS

Embodiments of the present invention are described below, by way of example only, with reference to the accompanying drawings, in which FIG. 1 illustrates communication links in a cell of a mobile telecommunication system according to an embodiment of the invention;

DESCRIPTION OF EMBODIMENTS

Figure 1:
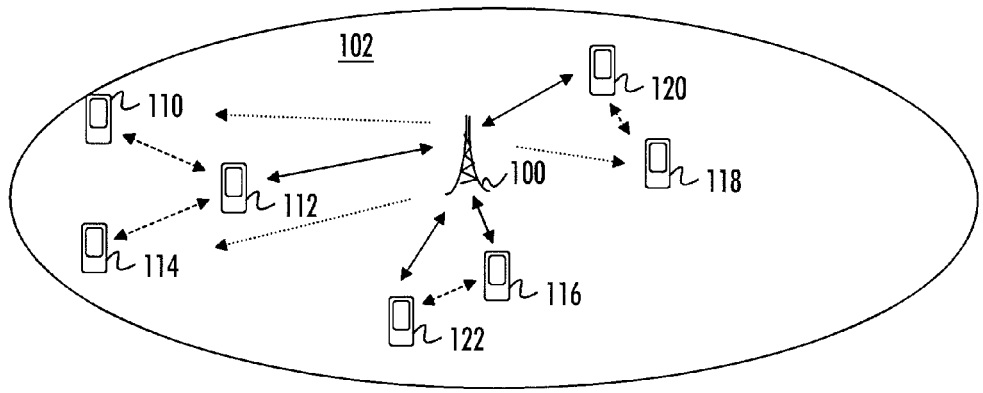

FIG. 1 illustrates communication links in a cell 102 of a mobile telecommunication system according to an embodiment of the invention. Referring to FIG. 1, the cell 102 is associated with a base station 100 controlling communications within the cell. The cell 102 controlled by the base station 100 may be divided into sectors, but such a scenario is not illustrated in greater detail in order not keep the focus on the invention. The base station 100 may control cellular radio communication links established between the base station 100 and a plurality of terminal devices 110 to 122 located within the cell 102.

As noted in the background section, device-to-device connections and ad hoc networks may be established among the terminal devices 110 to 122. Let us now discriminate the cellular radio connections from the device-to-device connections by denoting that a cellular radio communication link is established directly between a terminal device and the base station 100, and the cellular radio communication link may be established and operated according to a given radio standard supported by the mobile communication system of the base station 100. Such standard may be a long-term evolution of the UMTS (Universal Mobile Telecommunication System), for example. Additionally, the terminal device may support other communication protocol standards, such as GSM, GPRS, EDGE.

Furthermore, device-to-device communication links are established directly between two terminal devices, e.g. between terminal devices 118 and 120 in FIG. 1. The device-to-device connections may be based on cognitive radio technology. Accordingly, the terminal devices may be equipped with cognitive radio capability to provide the device-to-device communication links according to any of a plurality of radio access technologies. Moreover, the terminal devices are equipped with capability to adaptively select one of the supported radio access technologies according to the communication environment. Such radio access technologies may include standard and non-standard radio access technologies, e.g. Wireless LAN (IEEE 802.11), Bluetooth®, Ultra Wide Band. The radio access technologies may operate on the same frequency band as the first set of communication links and/or outside those frequency bands to provide the arrangement with flexibility.

Embodiments of the invention provide controlled selection between a direct cellular radio connection and a relayed connection for each terminal device supporting the cognitive radio technology. The selection of whether to use a direct or relayed connection may be made by the terminal device itself, the serving base station in a centralized manner, or as a result of negotiation between the terminal device and the serving base station. A relay terminal, which is a candidate to relay (or currently relaying) the link for the terminal device, may also take part in the negotiation.

Figure 2:
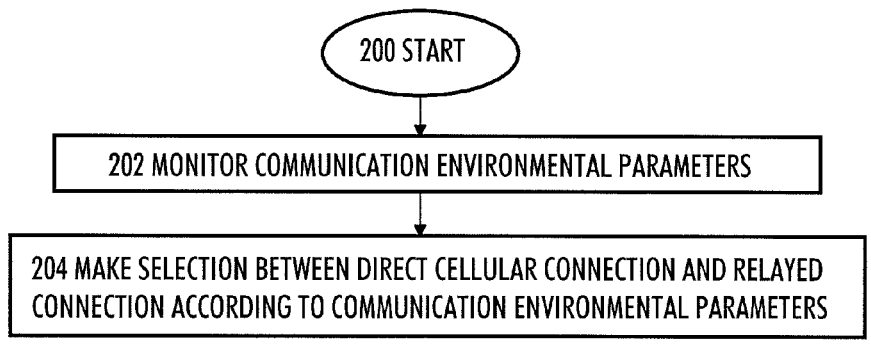
FIG. 2 illustrates a process for controlling the connection of a terminal device to a cellular telecommunication network.

Let us refer to FIG. 2 and describe the general concept of the selection according to an embodiment of the invention. FIG. 2 illustrates a process for controlling the connection of a terminal device to a cellular telecommunication network. The terminal device being controlled supports both direct cellular radio connections and device-to-device connections based on the cognitive radio technology. The terminal device may be in an idle state or in a connected state. FIG. 2 illustrates the process on a general level, and the process may be carried out by a controller applicable to the terminal device or in a controller of the base station. The process starts in block 200.

In block 202, communication-environmental parameters of the terminal device are monitored. When the process is executed in the terminal device, the monitored communication environmental parameters may include estimation of the quality of the direct cellular radio communication link with the base station, scanning and detection of availability of relay terminals in the neighborhood of the terminal device, detection of radio access technologies available for the relayed connections, battery power of the terminal device, etc. When the process is executed in the base station, the monitored communication environmental parameters may include estimation of the quality of the direct cellular radio communication link with the terminal device, detection of availability of relay terminals in the neighborhood of the terminal device, current allocation of radio resources in the cell controlled by the base station (and in neighboring cells), traffic load in the cell, etc.

In block 204, either a direct cellular radio connection or a relayed cellular radio connection is selected in order to connect the terminal device to the cellular telecommunication system. The selection is made on the basis of the communication environmental parameters monitored in block 202. Embodiments further defining the process of FIG. 2 are described below.

Figure 3:
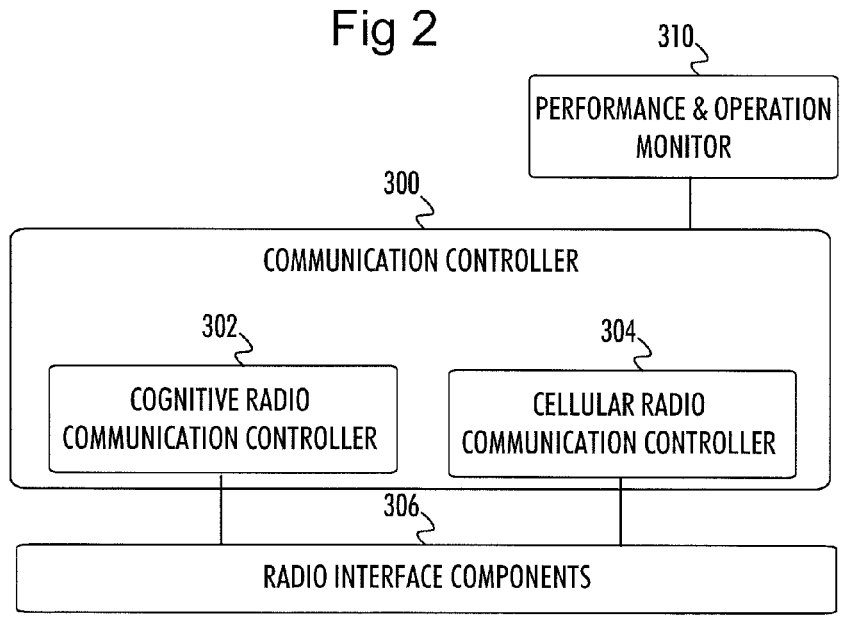
FIG. 3 illustrates the structure of a terminal device according to an embodiment of the invention.

FIG. 3 illustrates the structure of the terminal device according to an embodiment of the invention. The elements illustrated in FIG. 3 may be functional elements of the terminal device, and at least some of the elements may be implemented by a single processor, micro-controller, or corresponding structural element.

The terminal device comprises radio interface components 306 capable of providing radio communication parameters according to the physical layer protocols of one or more cellular telecommunication systems supported by the terminal device. Additionally, the radio interface components 306 may be configured to provide radio communication parameters according to a plurality of device-to-device radio communication protocols, e.g. one or more of the radio communication protocols listed above. The radio interface components 306 may include digital signal processing elements capable of providing multiple modulation, coding, and other signal processing operations on the baseband for signals to be transmitted and/or received. Additionally, the radio interface components 306 may comprise analog components at least some of which may be software defined to provide support for the wide range of radio access technologies.

The terminal device further comprises a higher-level controller 300 controlling the operation and inter-operability of both communication links of a first set (the cellular radio communication links with the serving base station and other parts of the serving cellular network) and the communication links of a second set (the cognitive radio communication links with other terminal devices). The communication controller 300 may provide linking between the cognitive radio connections and the cellular radio connections to provide the relayed link. Accordingly, the terminal device may both provide other terminal devices with a relayed connection or use the cognitive radio connection to establish a device-to-device connection to another terminal device in order to benefit from a relayed connection provided by the other terminal device.

The communication controller 300 may also determine which one of the direct and relayed cellular connection should be used. The selection of the connection type may be based on current communication environmental parameters of the terminal device. The communication environmental parameters may be monitored by a performance and operation monitoring unit 310. This unit 310 may monitor the battery level of the terminal device and/or the connection to the serving base station in order to determine the quality of the connection. The connection monitoring may be carried out in connection to handover or cell selection/re-selection measurements in which the terminal device monitors reception signal levels (RSSI) of signals received from different base stations. The performance and operation monitoring unit 310 may also monitor the quality of established device-to-device connections. The communication controller 300 may decide to establish a relayed connection, if the performance of the direct connection estimated by the performance and operation monitoring unit 310 drops below a determined threshold level. Similarly, the communication controller 300 may also decide to switch from a relayed connection to a direct connection or to another relayed connection, if the performance of the current relayed connection drops. In another embodiment, the communication controller 300 may determine to establish a relayed connection, if the battery power drops below a determined level in order to save battery power and extend the operative time of the terminal device. The device-to-device connections are short-range connections requiring less transmit power. Accordingly, the communication controller 300 may decide to utilize another terminal to carry out the long-range transmission.

The selection of the connection type may be made when the terminal device has established a radio resource control (RRC) connection with the base station. The terminal device may be either in an RRC idle state or in RRC connected state. In the RRC idle state, the terminal device has no active connection with the base station and no allocated radio resource but is capable of receiving RRC signaling information broadcasted by the base station. In the RRC connected state, a radio resource controller of the base station has allocated radio resources to the terminal device for data transfer. Additionally, properties of the device-to-device connections of the terminal device may be directly configured by the base station through RRC signaling. The RRC signaling may be used to configure the radio access technologies and communication parameters of the cognitive radio communication links.

Additionally, the communication controller 300 may select the connection type according to any one of the embodiments described below with reference to FIGS. 4 to 8.

The communication controller 300 comprises two sub-controllers: a cognitive radio communication controller 302 and a cellular radio communication controller 304. The cellular radio communication controller 304 is configured to establish, operate, and terminate cellular radio connections with a serving base station of a serving cellular network. The cellular radio communication controller 304 may also convey data and control signals related to the cognitive radio communication links under the control of the higher-level communication controller 300 so as to provide another terminal device with a relayed connection.

The base station may control the device-to-device connections in order to provide efficient utilization of radio resources in the cell. Accordingly, the communication controller 300 may communicate with the serving base station through the cellular radio communication controller 304 in order to negotiate radio access technologies for use in direct device-to-device communications with the other terminal devices in the same cell and communication parameters to be used. The negotiation may comprise indicating the capabilities of the terminal device to the base station and receiving the communication parameters from the base station. For example, the communication controller 300 may communicate to the base station which radio access technologies, frequency bands and other communication parameters the terminal device supports. The base station may then select the configuration according to the capabilities of the terminal device and other factors, such as current radio resource allocation and traffic load in the cell.

The cognitive radio communication controller 302 is configured to establish, operate, and terminate cognitive radio connections established with the other terminal devices. The cognitive radio communication controller 302 may receive the radio access technologies and communication parameters available for use from the communication controller 300.

Then, the cognitive radio communication controller 302 may determine the communication parameters to be used in the cognitive radio communication link on the basis of the available communication parameters and the channel environment between the two terminal devices between which the device-to-device connection is to be established. The cognitive radio communication controller 302 may negotiate about the communication parameters to be used with a corresponding cognitive radio communication controller in the other terminal device. The determination of the communication parameters may include the determination of modulation and coding schemes, frequency band, bandwidth, data rate, transport block size, diversity method, etc.

Figure 4:
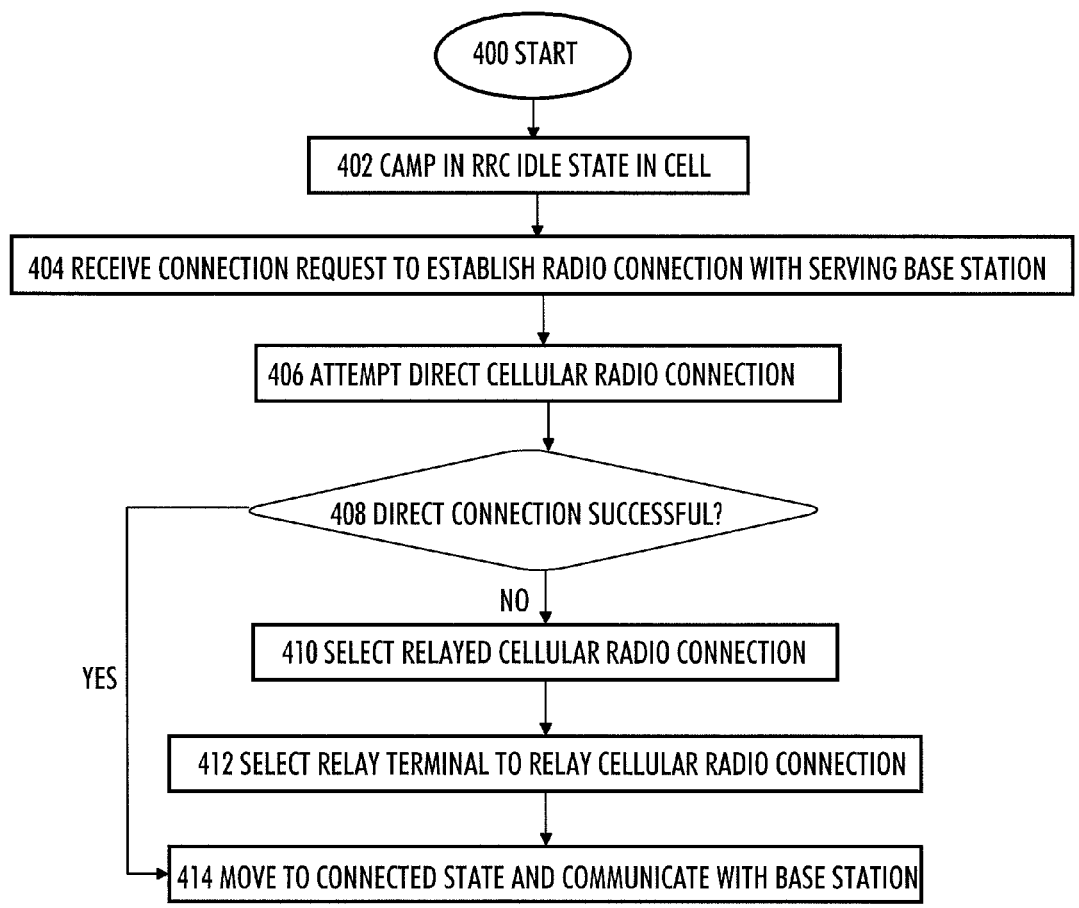
FIG. 4 illustrates an embodiment of a process for selecting a communication connection for a terminal device in a prioritized manner.

FIG. 4 illustrates an embodiment of a process for selecting a communication connection for the terminal device in a prioritized manner. The selection may be carried out by the communication controller 300. The process starts in block 400, and the terminal device camps in a cell of a serving base station in an RRC idle state in block 402. In block 404, the communication controller receives a request to establish a radio connection with the serving base station. The connection request may be received from a higher layer of the terminal device or as a paging request from the serving base station through the radio interface components 306.

In block 406, the communication controller attempts a direct cellular connection to the serving base station, and in block 408 it is determined whether or not the connection attempt was successful. The determination in block 408 may be based on the reception of a message from the cellular network, the message indicating completion or failure of the connection attempt. The connection attempt may be determined as failed if no such message was received from the cellular network. If the connection attempt was successful, the process moves to block 414 where the terminal device enters a connected state, i.e. transfers data with the base station over a data connection. If the connection attempt was not successful, the terminal device selects the relayed cellular radio connection in block 410. In block 412, the terminal device scans for available relay terminals in the neighborhood of the terminal device and selects a suitable relay terminal. The relay terminal may be detected as a result of detecting a beacon signal broadcasted by the relay terminals. The relay terminals broadcasting the beacon signal may be in the RRC connected state. Additionally, the terminal device establishes the device-to-device connection with the selected relay terminal and transmits to the relay terminal a request to establish the relayed connection to the base station. As a consequence, the relay terminal negotiates the relayed connection with the serving base station and links the device-to-device connection to a direct cellular radio connection of the relay terminal to provide the relayed connection. Then the process moves to block 414.

The procedure of FIG. 4, particularly from block 406 onwards, may be carried out if the monitored communication environmental parameters indicate that the direct cellular connection to any of the detected base stations is possible. For example, if the estimated performance of the direct cellular connection and the battery power of the terminal device are high enough, the process of FIG. 4 may be carried out. Otherwise, the terminal device may decide to select the relayed connection directly, if the relayed connection is available. The establishment of the direct connection may fail in case of heavy traffic in the network, for example. In the process of FIG. 4, the direct connection is preferred over the relayed connection.

Figure 5:
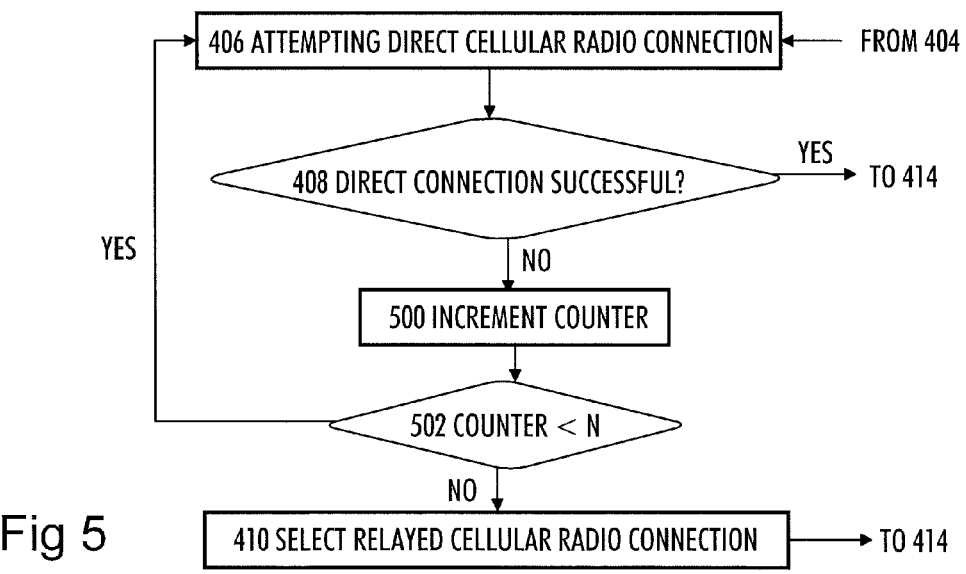
FIG. 5 illustrates another embodiment of a process for selecting a communication connection for a terminal device in a prioritized manner.

FIG. 5 illustrates another embodiment of a process for selecting a communication connection for a terminal device in a prioritized manner. In this process, the direct connection is attempted for a determined number of times before selecting the relayed connection. The blocks with the same numerals as those in FIG. 4 denote the corresponding steps. Accordingly, if the direct cellular radio connection attempt is successful in blocks 406 and 408, the process moves to block 414, as in the process of FIG. 4. Otherwise, the process moves to block 500 in which a counter is incremented by one. The successive direct cellular radio connection attempts may be made to the same or different base stations. The initial value of the counter may be zero. In block 502, it is determined whether the counter is still below N wherein N denotes the number of times the direct connection is attempted before selecting the relayed connection. If the counter is below N in block 502, the process returns to block 406. Otherwise, i.e. if the counter is equal to or higher than N, the process moves to block 410 in which the relayed connection is selected.

Figure 6:
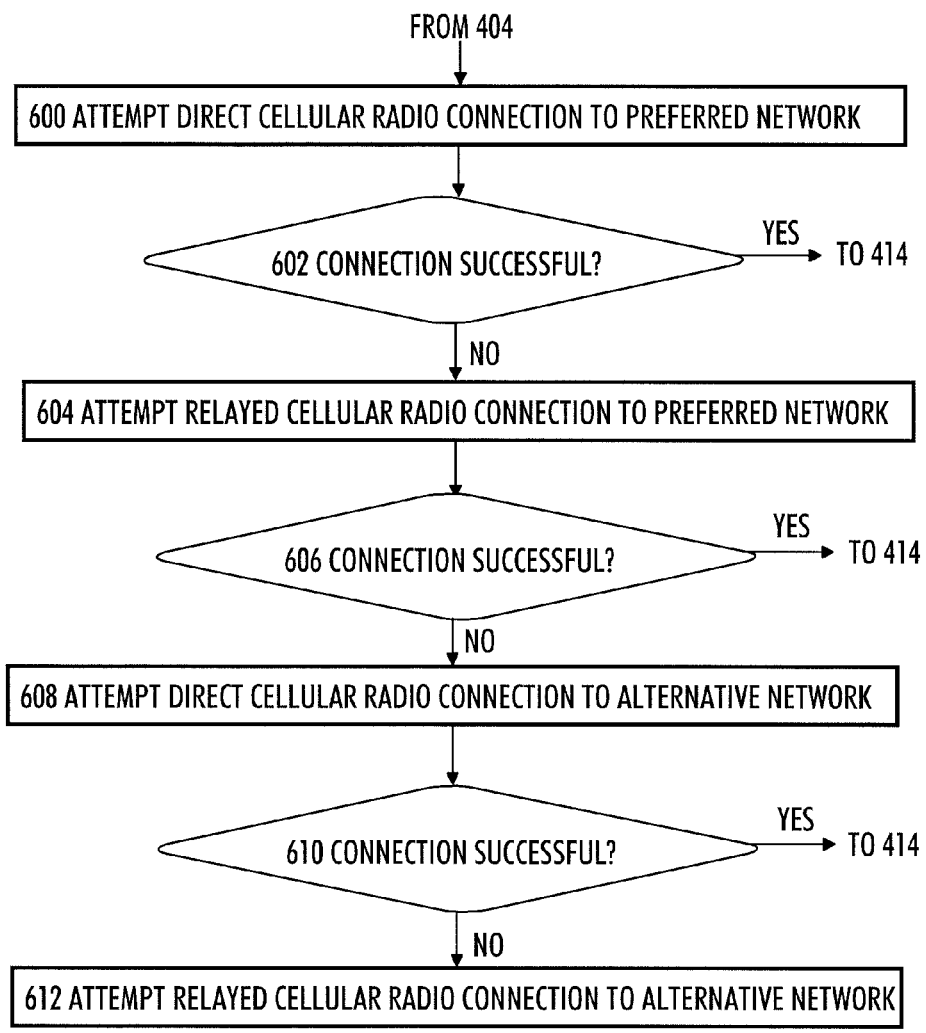
FIG. 6 illustrates yet another embodiment of a process for selecting a communication connection for a terminal device in a prioritized manner.

FIG. 6 illustrates yet another embodiment of the process for selecting a communication connection for a terminal device in a prioritized manner. In this case the prioritization is made between the direct and relayed connection and a primarily preferred and alternative cellular network. Upon generation of the connection request in block 404, the terminal device first attempts a direct cellular radio connection to the preferred cellular network in block 600. Typically, this is the direct cellular radio connection to the base station currently serving the terminal device in the RRC idle state. In block 602, it is determined whether or not the connection attempt to the preferred cellular network was successful. If the attempt was successful, the process moves to block 414.

Otherwise, the process moves to block 604, where the terminal device attempts a relayed cellular radio connection to the preferred cellular network. In block 604, the terminal device scans for relay terminals providing the relayed connection to the base station of the preferred cellular network. The relay terminals currently providing relayed connections may be configured to broadcast in the beacon signal an identifier of the base station, to which they provide the relayed connection. Accordingly, the terminal device may immediately identify the relay terminals providing the relayed connection to the preferred cellular network from the base station identifier contained in the detected beacon signals. As a consequence, the terminal device may select a relay terminal providing the relayed connection to the preferred cellular network and attempt a device-to-device connection with such a relay terminal.

In block 606, it is determined whether or not the connection attempt to the preferred cellular network through a relay terminal was successful. If the attempt was successful, the process moves to block 414. Otherwise, the process moves to block 608 where the terminal device attempts a direct cellular radio connection to an alternative cellular network. In block 610, it is determined whether or not the connection attempt to the alternative cellular network was successful. If the attempt was successful, the process moves to block 414.

Otherwise, the process moves to block 612, where the terminal device attempts a relayed cellular radio connection to the alternative cellular network. In block 612, the terminal device may scan for relay terminals providing the relayed connection to the base station of the alternative cellular network. The terminal device may identify the relay terminals providing the relayed connection to the alternative cellular network from the base station identifier included in the detected beacon signals. If the attempt performed in block 612 fails, the process may return to block 600, or the terminal device may indicate to a user of the terminal device about the failed connection attempt.

Figure 7:
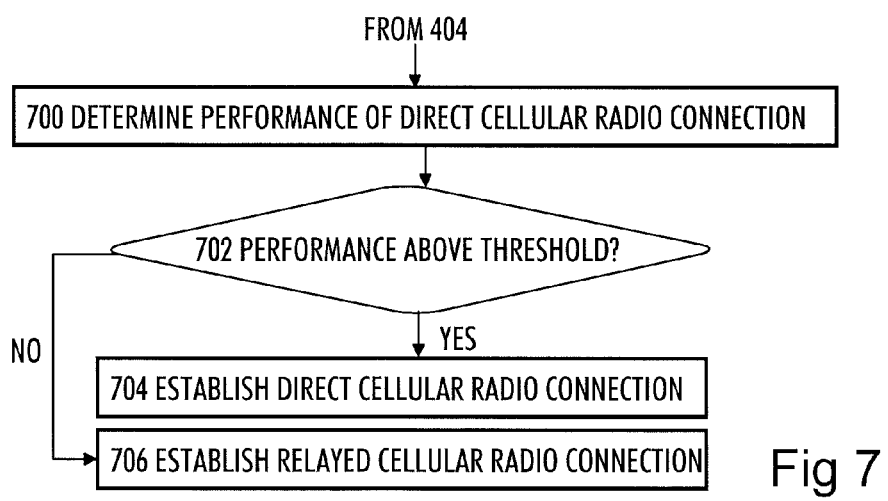
FIG. 7 illustrates an embodiment of a process for selecting a communication connection for a terminal device according to monitored communication properties.

FIG. 7 illustrates an embodiment of a process for selecting a communication connection for the terminal device according to the monitored communication properties. Upon generation of the connection request in block 404, the terminal device determines the performance of the direct cellular radio connection in block 700. The terminal device may determine the performance of the direct cellular connection by analyzing a pilot signal broadcasted by the serving base station. The serving base station may be selected after a cell (re)selection procedure carried out immediately before the process of FIG. 7 in order to ensure that a possible handover is carried out in the RRC idle state. The terminal device may calculate the strength, i.e. a received signal strength indicator (RSSI), and/or carrier-to-interference ratio (CIR) from the received pilot signal. In block 702, the terminal device determines whether the performance is above a predetermined threshold level. The threshold level may be based on a cell selection threshold used as a cell suitability criterion in the cell (re)selection procedure. However, an offset may be added to the cell selection threshold to enable the selection of the relayed cellular radio connection before triggering any cell (re)selection procedure. Accordingly, the predetermined threshold level used in block 702 is the cell selection threshold for a suitability criterion of the serving base station plus the offset. The cell selection threshold may vary between different base stations and, as a consequence, the predetermined threshold level is also a semi-static parameter.

If the determined performance is above the predetermined threshold level, the quality of the direct cellular connection is determined to be sufficiently high and the process moves to block 704 where the direct cellular radio connection with the serving base station is established. However, if the determined performance is below the predetermined threshold level, the quality of the direct cellular connection is determined not to be sufficiently high and the process moves to block 706 where the relayed cellular radio connection with the serving base station is established through a relay terminal.

During the process, the terminal device may scan for relay terminals in order to be aware of the available relayed connection. In block 702, the performance may also be compared with a second threshold level which is the predetermined threshold level plus a second offset. Accordingly, the second threshold level is the cell selection threshold for the suitability criterion plus the first offset plus the second offset. The comparison with the second threshold level may be carried out before the comparison with the lower threshold level. If the performance is above the second threshold level, the second comparison may be omitted, the process may move to block 704, and the terminal device may temporarily disable the scanning for the relay terminals in order to save the battery power. If the performance is below the second threshold level, the second comparison with the lower threshold level is carried out.

Figure 8:
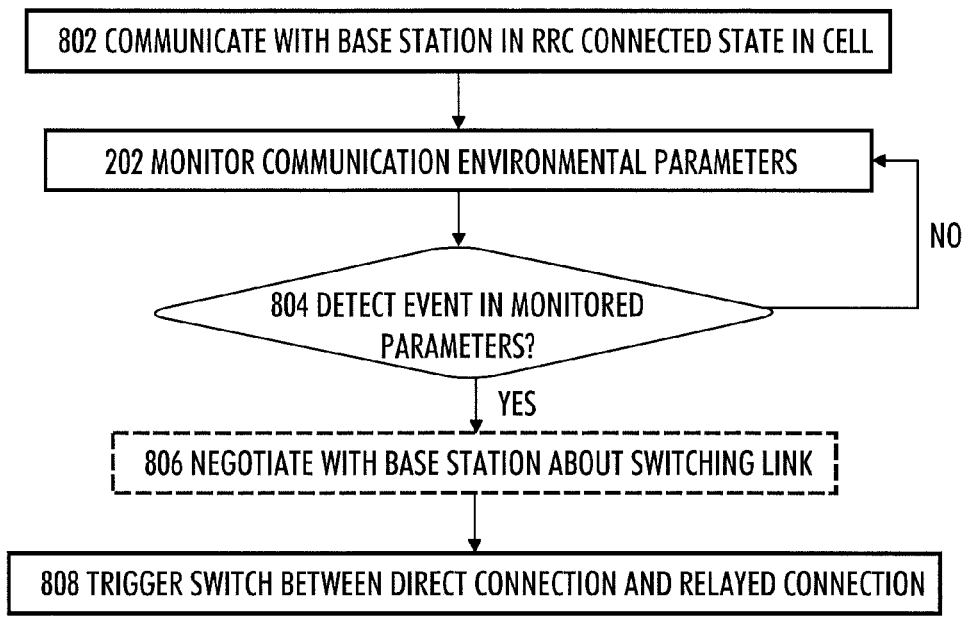
FIG. 8 illustrates another embodiment of a process for selecting a communication connection for a terminal device according to monitored communication properties.

The processes described above in connection with FIGS. 4 to 7 relate to the establishment of the cellular radio connection with the serving base station. In other words, the terminal device is initially in the RRC idle state and selects the connection type to move to the RRC connected state to establish a data connection with the base station. However, the selection of the connection type may also be carried out while the terminal device is already in the connected state. Accordingly, the connection of the terminal device in the RRC connected state may be switched between the direct connection and the relayed connection. FIG. 8 illustrates a process in which the connection of the terminal device in the RRC connected state is switched between the direct connection and the relayed connection. In block 802, the terminal device has established a communication connection with the serving base station and is communicating with the base station in the RRC connected state. Accordingly, the terminal device may transfer application data with the base station. The communication connection may be the direct or relayed connection. At the same time, the terminal device monitors communication environmental parameters in block 202. The monitored communication parameters may include monitoring the quality of the communication connection (bit error rate, CIR), monitoring the battery power of the terminal device, etc. In case the communication connection is the direct cellular connection, the terminal device may monitor the quality of the direct cellular link. However, if the communication connection is the relayed cellular connection, the terminal device may monitor the quality of the device-to-device connection with the relay terminal.

In block 804, it is determined whether or not an event is detected in the monitored parameters. The event may be degradation of the quality of the communication connection below a determined threshold level (not necessarily the same threshold as described above) and/or critically low battery power. If there is no such event, the process returns to block 202. If the event is detected, the process moves to block 806 in which the terminal device negotiates with the serving base station about the switch of the link. Block 806 may comprise the transmission of a request to the serving base station to transfer the link from the relay connection to the direct connection (or vice versa). If the terminal device requests a switch from the direct link to the relayed link, the terminal device may also send to the base station a measurement report comprising reception signal levels associated with a number of relay terminals whose beacon signal the terminal device has detected and measured.

The base station may then analyze the request and the measurement report, check whether the switch is allowed by evaluating the effect of the switch on the performance of other connections, the availability of the radio resources for the other connection type, the status of the relay terminals proposed by the terminal device, etc. Then, the base station may determine whether or not to accept the switch of the connection type and indicate the decision to the terminal device. The negotiation may be carried out as layer-three RRC signaling or as layer-two MAC (Medium Access Control) signaling.

In block 808, the switch between the direct connection and the relayed connection is triggered, and the connection type is switched. The switch may be a hard or soft switch. In the soft switch, the old connection is released only after the establishment of the new connection, while in the hard switch, the old connection released before establishment of the new connection. This is analogous to handovers.

The execution of block 806 may also be omitted in case the base station does not assume strict control of the connections in the cell. In such a case, the terminal device may in block

808 simply initiate the release of one connection type and establishment of the other connection type with the base station. If the direct cellular connection is to be switched to the relayed connection, the terminal device may initiate device-to-device connection establishment with a selected relay terminal and the release of the direct cellular connection.

FIG. 8 illustrates a process in which the terminal device initiates the switch of the connection type. Alternatively, the switch of the connection type may be initiated by the serving base station. As mentioned above, the base station may also monitor the communication environmental parameter of the terminal device. Additionally, the base station monitors and controls allocation of radio resources and traffic load in the cell. The base station may also select and configure the relay terminals according to the capabilities of the terminal devices, radio resource utilization in the cell, battery power of the terminal devices, traffic conditions of the terminal devices, channel qualities experienced by the terminal devices, locations (distribution) of the terminal devices in the cell, etc. Accordingly, the base station has knowledge of the relay terminals in the cell. Upon detection of degraded quality of a direct cellular connection with the terminal device, increased load in the cell, etc., the base station may check the status of the relay terminals in the cell. Upon detection of one or more suitable candidate relay terminals to relay the connection of the terminal device experiencing the low-quality connection, the base station may configure the terminal device to measure the reception strength of the beacon signal of the candidate relay terminals. To this end, the base station may provide the terminal device with identifiers of the candidate relay terminals. The terminal device then measures the reception strengths and transmits the measurement results to the base station. If the measurements indicate sufficiently high reception power associated with one of the candidate relay terminals, the base station configures the terminal device and the selected relay terminal to pair up and establish a device-to-device connection. Additionally, the base station may configure the selected relay terminal to relay the connection of the terminal device. The base station may also indicate the radio access technology and communication parameters for the device-to-device connection. Upon establishment of the device-to-device connection between the terminal device and the relay terminal, the base station may receive from the relay terminal a pairing response message indicating the completion of the relayed link. Then, the base station may release the direct link with the terminal device.

The base station may also initiate the switch from the relayed connection to the direct connection. If there are radio resources and sufficient communication quality available for the direct connection, the base station may prefer the direct connection and configure the terminal device and the relay terminal to release the relayed connection. Furthermore, the base station establishes the direct cellular radio connection with the terminal device.

The base station may comprise a controller controlling the operation of the cellular radio connections in the cell. The controller may comprise an interface to enable transfer of information signals with the terminal devices and other parts of the cellular network. The controller may also be configured to control the device-to-device connections in the cell. The controller may be configured to control the selection of connection types for the terminals devices according to monitored communication environment in the cell. The controller may select individually for each terminal device whether to use the direct cellular radio connection or the relayed cellular connection according to the estimated qualities of the communication links, current allocation of the radio resources, availability of the relay terminals, utilization of the relay terminals, traffic load in the cell, etc.

Figure 9:
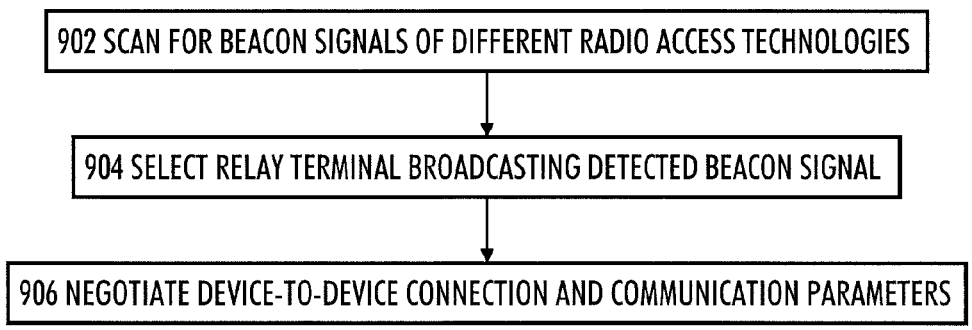
FIG. 9 illustrates an embodiment of a process for establishing a device-to-device communication connection to another terminal device.

FIG. 9 illustrates an embodiment of a process for establishing a device-to-device communication connection with a relay terminal in the terminal device according to an embodiment of the invention. In block 902, the terminal device scans for beacon signals of different radio access technologies. The relay terminals may be configured by the base station to broadcast beacon signals of those radio access technologies the base station has selected for use in the relayed connections. The base station may also broadcast on a broadcast control channel information indicating the radio access technologies currently used for the relayed connections. Therefore, the terminal device does not have to scan for all the possible beacon signals. The terminal device detects from the received beacon signals an identifier of the base station to which the corresponding relay terminal provides the relayed connection. Additionally, each beacon signal comprises an identifier of the relay terminal broadcasting the beacon signal. The identifier may be an identifier allocated by the base station for use in cellular radio connections. The identifier may be a Radio Network Temporary Identifier (RNTI) unique for each cellular radio terminal in the cell. Accordingly, the relay terminal may use the RNTI in the provision of the relayed connections.

In block 904, the terminal device selects a relay terminal whose beacon signal the terminal device has detected in block 902. The relay terminals may be configured to broadcast explicit information on the availability in the beacon signal, in which case the terminal device may select the relay terminal according to the reception strengths of the received beacon signals, for example. Alternatively, the terminal device may select the relay terminal according to information on the relay communication capabilities of available relay terminals, wherein the information is received in the beacon signals. For example, each relay terminal may broadcast implicit information concerning the quality, data rates, transport block size and corresponding information related to the relayed connection. Then, the terminal device may select a relay terminal providing the most suitable connection for the terminal device.

In block 906, the terminal device negotiates with the selected relay terminal a device-to-device connection to be linked to a cellular radio connection between the relay terminal and the base station. The negotiation may comprise an agreement on the radio access technology and communication parameters to be used in the device-to-device connection. The agreement on the radio access technology may be needed when both terminals support multiple radio access technologies currently available for use in the relayed connections. Both the terminal device and the relay terminal may use the RNTI or a corresponding temporary cellular network identifier allocated by the base station in the device-to-device connections. The identifier may be an RRC idle RNTI or an RRC connected RNTI, depending on the initial state of the devices. Since relay terminals are in the RRC connected state when they provide the relayed connections, they use the RRC connected RNTI in the device-to-device connections used in the relayed connections. The terminal device requesting the relayed connection may use the RRC idle RNTI or the RRC connected RNTI, depending on the RRC state of the terminal device. The RNTI is typically unique for each terminal within a limited area in the cellular network. Alternatively, a globally unique identifier may be used.

During the negotiation of the device-to-device connection, the relay terminal may authenticate the terminal device requesting the relayed connection on the basis of the RNTI received from the terminal device. Additionally, the terminal device may transmit the identifier of the base station to indicate the base station to which the relayed connection should be established. Then, the relay terminal may compare the received base station identifier with the identifier of the base station, to which the relay terminal provides the relayed connection, and accept the relayed connection, if the base station identifiers match. Additionally, the relay terminal may negotiate with the base station of the establishment of the relayed link. The establishment of the relayed link may comprise the establishment of a new logical connection between the relay terminal and the base station. Upon establishment of the relayed connection, data may be transferred between the terminal device and the base station through the relay terminal.

The processes or methods described in FIGS. 2 and 4 to 9 may also be carried out in the form of a computer process defined by a computer program. The computer program may be in source code form, object code form, or in some intermediate form, and it may be stored on a carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
Monitoring, while in an idle state by a terminal device of a cellular telecommunication system, communication-environmental parameters of the cellular telecommunication system, wherein the terminal device supports cellular radio connections established directly between the terminal device and a base station of the cellular telecommunication system and device-to-device connections established directly between two or more terminal devices according to one or more radio access technologies selected from a plurality of radio access technologies supported by the two or more terminal devices;
Selecting, by the terminal device in the idle state prior to establishing a communications connection, either a direct cellular radio connection or a relayed cellular radio connection to connect the terminal device to the cellular telecommunication system, wherein the relayed cellular radio connection refers to a connection established between the base station and the terminal device through a relay terminal device configured to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters.

2. The method of claim 1, wherein configuring of the radio access technology of the device-to-device connection comprises broadcasting on a broadcast control channel information indicating the radio access technologies currently used in the device-to-device connections for the relayed connections.

3. The method of claim 1, wherein the radio access technology of the device-to-device connection is configured by using radio resource control signaling receivable by terminal devices having a radio resource control connection with the base station.

4. The method of claim 1, further comprising: triggering a switch between the direct cellular radio connection and the relayed cellular radio connection upon detection of a predetermined event in the monitored communication-environmental parameters of the terminal device in a connected state.

5. The method of claim 1, wherein the selection of the relayed connection comprises:
scanning for beacon signals of relay terminals providing the relayed cellular connection to the base station;
establishing with a selected relay terminal a device-to-device connection to be linked to a cellular radio connection between the relay terminal and the base station; and
communicating with the base station through the relay terminal.

6. The method of claim 5, wherein the establishment of the device-to-device connection with the relay terminal further comprises negotiating a radio access technology and transmission parameters to be used in the device-to-device connection.

7. An apparatus comprising:
a controller; and
a memory including computer program code,
the memory and the computer program code configured, with the controller, to cause the apparatus to perform at least the following:
monitoring, while in an idle state by a terminal device of a cellular telecommunication system, communication-environmental parameters of the cellular telecommunication system, wherein the terminal device supports direct cellular radio connections established directly between the terminal device and a base station of the cellular telecommunication system and device-to-device connections established directly between two or more terminal devices according to one or more radio access technologies selected from a plurality of radio access technologies supported by the two or more terminal devices, and
selecting, by the terminal device in the idle state, prior to establishing a communications connection either a direct cellular radio connection or a relayed cellular radio connection as the communications connection to connect the terminal device to the cellular telecommunication system, wherein the relayed cellular radio connection refers to a connection configured by the base station by selecting one or more radio access technologies for communication by the terminal device through a relay terminal device configured to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters.

8. The apparatus of claim 7, wherein the memory and the computer program code are further configured, with the controller, to cause the apparatus to perform at least the following: carry out the selection by attempting first the cellular radio connection and selecting the relayed cellular radio connection upon failure to establish the cellular radio connection.

9. The apparatus of claim 7, wherein the memory and the computer program code are further configured, with the controller, to cause the apparatus to perform at least the following: attempt first the direct cellular radio connection to a primarily preferred cellular telecommunication system;
    upon failure to establish the cellular radio connection to the primarily preferred cellular telecommunication system, to attempt the relayed cellular radio connection to the primarily preferred cellular telecommunication system; and
    upon failure to establish the relayed cellular radio connection to the primarily preferred cellular telecommunication system, to attempt a direct cellular radio connection to an alternative cellular telecommunication system.

10. The apparatus of claim 7, wherein the memory and the computer program code are further configured, with the controller, to cause the apparatus to perform at least the following: determine the performance of the direct cellular radio connection from the monitored communication-environmental parameters, to select the direct cellular radio connection, if the determined performance of the direct cellular radio connection exceeds a predetermined threshold level, and to select the relayed cellular radio connection, if the determined performance of the direct cellular radio connection does not exceed a predetermined threshold level.

11. The apparatus of claim 10, wherein the predetermined threshold level is a cell selection threshold used for cell suitability determination in cell selection by the terminal device plus an offset value to enable the selection of the relayed cellular radio connection before triggering a cell reselection.

12. The apparatus of claim 10, wherein the memory and the computer program code are further configured, with the controller, to cause the apparatus to perform at least the following: configure the terminal device to scan the presence of relay terminals in order to determine the availability of the relayed cellular radio connections, and to disable the scanning, if the determined performance of the direct cellular radio connection exceeds the predetermined threshold level plus a second offset value.

13. The apparatus of claim 7, wherein the memory and the computer program code are further configured, with the controller, to cause the apparatus to perform at least the following: trigger a switch between the direct cellular radio connection and the relayed cellular radio connection upon detection of a predetermined event in the monitored communication-environmental parameters of the terminal device in a connected state.

14. The apparatus of claim 7, wherein the memory and the computer program code are further configured, with the controller, to cause the apparatus to perform at least the following: establish the relayed connection by configuring the terminal device to scan for beacon signals of relay terminals providing the relayed cellular connection to the base station, establishing with a selected relay terminal a device-to-device connection to be linked to a cellular radio connection between the relay terminal and the base station, and communicating with the base station through the relay terminal; and
wherein the establishment of the device-to-device connection with the relay terminal further comprises negotiating a radio access technology and transmission parameters to be used in the device-to-device connection.

15. A method for managing connections in a terminal device of a cellular telecommunication system, the method comprising:
    monitoring, while in an idle state by a terminal device of a cellular telecommunication system, communication-environmental parameters of the cellular telecommunication system, wherein the terminal device supports cellular radio connections established directly between the terminal device and a base station of the cellular telecommunication system and device-to-device connections established directly between two or more terminal devices according to one or more radio access technologies selected from a plurality of radio access technologies supported by the two or more terminal devices;
    selecting, by the terminal device in the idle state prior to establishing a communications connection, either a direct cellular radio connection or a relayed cellular radio connection to connect the terminal device to the cellular telecommunication system on the basis of the monitored communication-environmental parameters, wherein the relayed cellular radio connection refers to a connection established between the base station and the terminal device through a relay terminal device configured by the base station by selecting the one or more radio access technologies to link a device-to-device connection established between the relay terminal and the terminal device to a cellular radio connection between the relay terminal device and the base station, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters; and
    receiving from the base station the configuration of the one or more radio access technologies to be used in the device-to-device connection for the relayed cellular radio connection and utilizing said received configuration in the device-to-device connection of the relayed cellular connection.

16. The method of claim 15, wherein the selection of the relayed connection comprises:
    scanning for different types of beacon signals of relay terminals providing the relayed cellular connection to the base station, wherein the scanning for different types of beacon signals is limited by the received information indicating the radio access technologies currently used in the device-to-device connections for the relayed connections;
    establishing with a selected relay terminal a device-to-device connection to be linked to a cellular radio connection between the relay terminal and the base station; and
    communicating with the base station through the relay terminal.

17. The method of claim 16, wherein the establishment of the device-to-device connection with the relay terminal further comprises negotiating a radio access technology and transmission parameters to be used in the device-to-device connection.

18. The method of claim 15, wherein the selection further comprises:
  determining the performance of the direct cellular radio connection from the monitored communication-environmental parameters;
  selecting the direct cellular radio connection, if the determined performance of the direct cellular radio connection exceeds a predetermined threshold level; and
  selecting the relayed cellular radio connection, if the determined performance of the direct cellular radio connection does not exceed a the predetermined threshold level.

19. The method of claim 18, wherein the predetermined threshold level is a cell selection threshold used for cell suitability determination in cell selection by the terminal device plus an offset value to enable the selection of the relayed cellular radio connection before triggering a cell reselection.

20. The method of claim 18, wherein the performance of the direct cellular radio connection is determined on the basis of measured strength of a signal received from the base station.

21. The method of claim 18, further comprising:
  scanning the presence of relay terminals in order to determine the availability of the relayed cellular radio connections; and
  disabling the scanning, if the determined performance of the direct cellular radio connection exceeds the predetermined threshold level plus a second offset value.

22. A method, comprising:
  receiving a connection request at a terminal device;
  monitoring, while in an idle state by the terminal device of a cellular telecommunication system, one or more communication-environmental parameters of the cellular telecommunication system prior to establishing a communications connection with the cellular telecommunication system, wherein the terminal device is capable of establishing the communications connection with the cellular telecommunication system via a cellular radio connection directly with a base station of the cellular telecommunication system, and where the terminal device is capable of establishing the communications connection with the cellular telecommunication system via a relayed communication connection directly with another terminal device and indirectly with the base station via the relayed communication connection; and
  establishing the communications connection with the cellular telecommunication system using either a direct connection between the terminal device and the base station or using the relayed communication connection between the terminal device and said another terminal device depending on the monitored communication-environmental parameters, wherein the relay terminal device is controlled by the base station to broadcast a beacon signal, and the monitored communication-environmental parameters include the beacon signal and a broadcast control signal from the base station, and wherein the terminal device selects either the direct cellular radio connection or the relayed cellular radio connection depending on the monitored communication-environmental parameters, and wherein the relayed communication connection is configured by the base station by selecting one or more radio access technologies selected from a plurality of radio access technologies supported by the terminal device and said another terminal device, and wherein the communications connection is determined by the terminal device depending on the monitored communication-environmental parameters prior to establishing the communications connection.

23. The method according to claim 22, wherein the communication-environmental parameters include an estimation of a quality of the direct cellular radio communication link with the base station, availability of the connection with another terminal device, detection of radio access technologies available for the relayed connection, and battery power of the terminal device.

24. The method of claim 22, wherein monitoring one or more communication-environmental parameters of the terminal device includes scanning for beacon signals of relay terminals including said another terminal device for providing the relayed communication connection.

25. The method of claim 22, wherein the scanning for beacon signals is limited by information received by the terminal device indicating radio access technologies currently available for the relayed communication connection;
  and wherein establishing the communications connection includes establishing with a selected relay terminal a device-to-device connection to be linked to a cellular radio connection between the relay terminal and the base station, and communicating with the base station through the relay terminal.

26. The method of claim 22, wherein the establishment of the device-to-device connection with the relay terminal further comprises negotiating a radio access technology and transmission parameters to be used in the device-to-device connection.

27. The method of claim 22, wherein the monitoring one or more communication-environmental parameters includes determining the performance of the cellular radio connection directly with the base station from the monitored communication-environmental parameters;
  and wherein establishing the communications connection includes using the connection between the terminal device and the base station if the determined performance of the cellular radio connection directly with the base station exceeds a predetermined threshold level, and using the relayed communication connection, if the determined performance of the cellular radio connection directly with the base station does not exceed the predetermined threshold level.

28. The method of claim 27, wherein the predetermined threshold level is a cell selection threshold used for cell suitability determination in cell selection by the terminal device plus an offset value to enable the selection of the relayed communication connection before triggering a cell reselection.

29. The method of claim 27, further comprising:
  scanning for the presence of relay terminals including said another terminal in order to determine the availability of the relayed communication connection; and
  disabling the scanning, if the determined performance of the cellular radio connection directly with the base station exceeds the predetermined threshold level plus an offset value.

30. The method of claim 27, wherein the performance of the cellular radio connection directly with the base station is determined on the basis of measured strength of a signal received from the base station.

* * * * *